INVENTORS
BASTIAAN KLAAS NEDERLOF
DINGEMAN BIJL
JAN JOHANNES VAN DER MEIJ
BY Wenderoth, Lind & Ponack. Attorneys INVENTORS
BASTIAAN KLAAS NEDERLOF
DINGEMAN BIJL
JAN JOHANNES VAN DER MEIJ
BY Wenderoth, Lind & Ponack, Attorneys INVENTORS
BASTIAAN KLAAS NEDERLOF
DINGEMAN BIJL
JAN JOHANNES VAN DER MEIJ
BY Wenderoth, Lind & Ponack, attorneys

INVENTORS
BASTIAAN KLAAS NEDERLOF
DINGEMAN BIJL
JAN JOHANNES VAN DER MEIJ

BY Wenderoth, Lind & Ponack, Attorneys

INVENTORS
BASTIAAN KLAAS NEDERLOF
DINGEMAN BIJL
JAN JOHANNES VAN DER MEIJ
BY Wenderoth, Lind & Ponack, attorneys INVENTORS
BASTIAAN KLAAS NEDERLOF
DINGEMAN BIJL
JAN JOHANNES VAN DER MEIJ
BY Wenderoth, Lind & Ponack, Attorneys United States Patent Office 3,434,078
Patented Mar. 18, 1969

3,434,078
PHOTOPRINTING APPARATUS

Bastiaan Klaas Nederlof, Delft, Dingeman Bijl, Rotterdam, and Jan Johannes van der Meij, Leidschendam, Netherlands, assignors to N.V. Lichtdrukpapierfabriek "De Atlas," Delft, Netherlands, a corporation of the Netherlands Continuation-in-part of application Ser. No. 279,897, May 13, 1963. This application June 25, 1965, Ser. No. 467,054
Filed June 25, 1965, Ser. No. 467,054
Claims priority, application Netherlands, May 14, 1962, 278,412
U.S. Cl. 355—79 19 Claims
Int. Cl. G03b *27/02, 27/32*

ABSTRACT OF THE DISCLOSURE

A method and apparatus of separating information and reproducing the same on photosensitive material in re-combined form. Such information is recorded respectively, on a first, a second, and a third collection of *a, b,* and *c* transparent information carrying units, respectively. Each unit of the first collection carrying *e* items of subdata, as well as *d* series of yes-no signals, each corresponding with at least one of said items of subdata and adapted to be sensed by sending means. Then sensing each unit of said first collection a first time and a second time to cause selected items of subdata to be printed on photosensitive material on which the associated main data has been printed during the preceding printing operation.

This is a continuation-in-part of application Ser. No. 279,897, filed May 13, 1963, now abandoned.

This invention relates to a method of separating information and reproducing the same on photosensitive material in re-combined form, and to a photoprinting apparatus, especially the exposure unit thereof, particularly, but not exclusively, for use with said method.

According to the present invention, there is provided a method of separating information and reproducing the same on photosensitive material in re-combined form, which comprises recording such information, respectively, on a first, a second, and a third collection of *a*, *b*, and *c* transparent information carrying units, respectively, each unit of said first collection carrying *e* items of subdata, as well as *d* series of yes-no signals, each corresponding with at least one of said items of subdata and adapted to be sensed by sensing means, the *n*th unit of said second collection carrying at least one item of main data associated with the subdata appearing on the *n*th unit of said first collection, it being understood that *b* is equal to *a*, and each unit of said third collection carrying information characteristic of the nature of one of *c* types of reproductions to be made, and successively printing selected ones of said items of subdata on photosensitive material in response to each yes signal of a predetermined one of said *d* series of yes-no signals, in combination with their associated items of main data and the information carried by a selected one of said third collection.

According to a further important feature of the invention, there is provided a method of separating information and reproducing the same on photosensitive material in re-combined form, which comprises recording such information, respectively, on a first, a second, and a third collection of *a, b,* and *c* transparent information carrying units, respectively, each unit of said first collection carrying *e* items of subdata, as well as *d* series of yes-no signals, each corresponding with at least one of said items of subdata and adapted to be sensed by sensing means, the *n*th unit of said second collection carrying at least one item of main data associated with the subdata appearing on the *n*th unit of said first collection, it being understood that *b* is equal to *a*, and each unit of said third collection carrying information characteristic of the nature of one of *c* types of reproductions to be made, sensing each unit of said first collection a first time to count the number ($m$) of yes signals of a selected series of yes-no signals appearing on such unit, sensing such unit a second time to thereby cause selected items of subdata to be printed on photosensitive material on which the associated main data has been printed during the preceding printing operation, and to cause the *n*th unit of said second collection to be replaced by the ($n+1$)th unit thereof after completion of the ($m-1$)th print of the *n*th unit of said first collection.

It is one object of the invention to provide an automatic photoprinter for use with said methods and capable of performing a multiplicity of essential operations simultaneously, thereby to reduce the overall time required.

The novel features of our invention, and further objects and advantages thereof will become apparent from the following description with reference to the accompanying drawings. We wish it to be understood, however, that said drawings are an exemplary, diagrammatic illustration of our invention only, showing one form of structural realization of the principles thereof, but not intended to limit the scope of the invention in any way.

There will first be given a general description of the apparatus and the operation thereof, then a detailed description of various main parts thereof, and then a detailed description of the operation of the machine.

GENERAL DESCRIPTION

Figure 1:
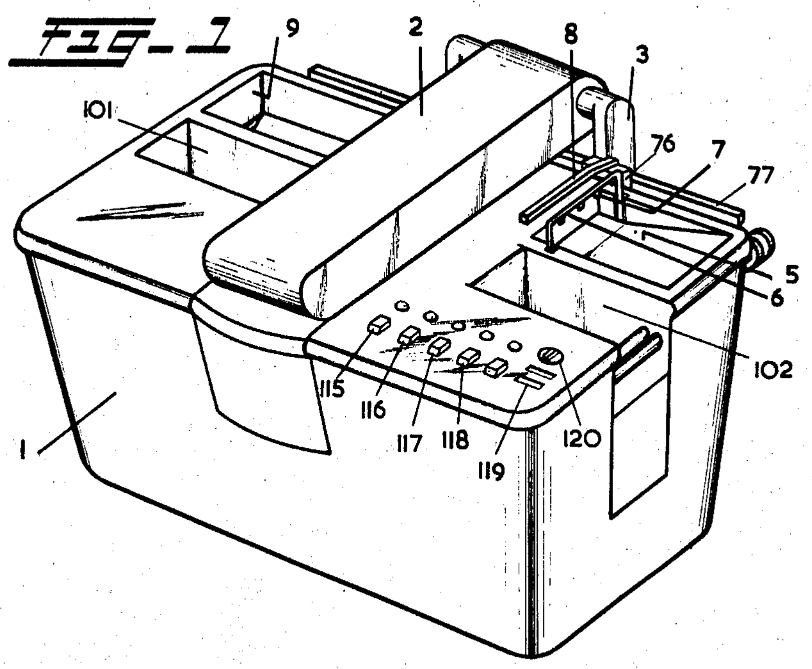
FIG. 1 is a perspective view of the whole apparatus.
Figure 6:
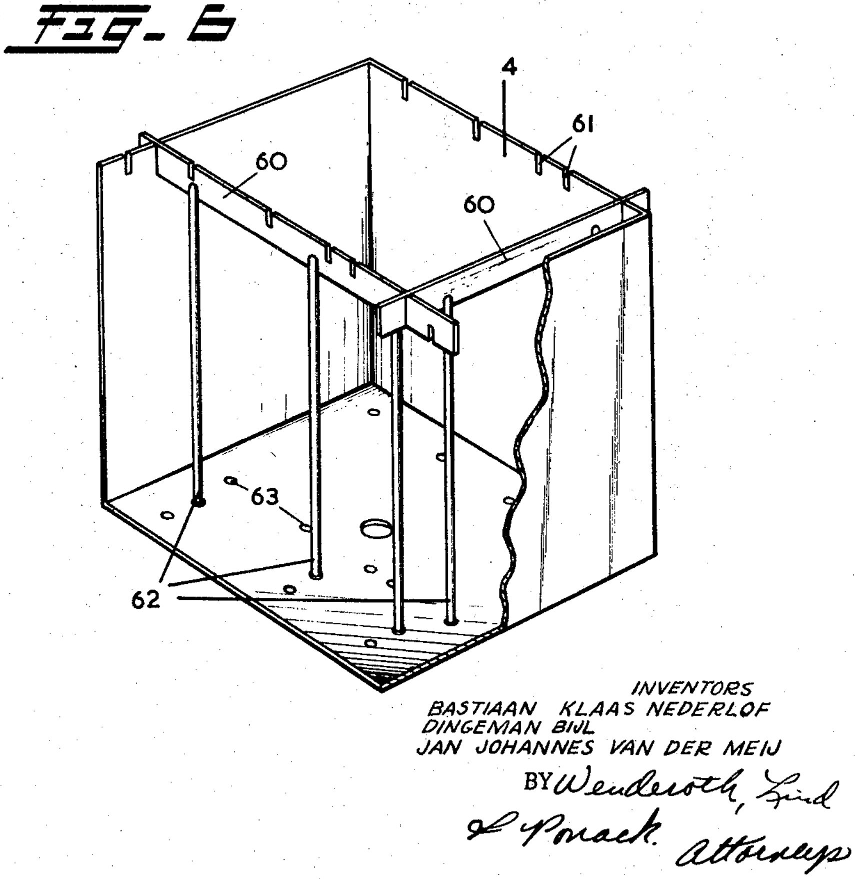
FIG. 6 is a perspective view of a part of a supply container for photosensitive material.
Figure 10:
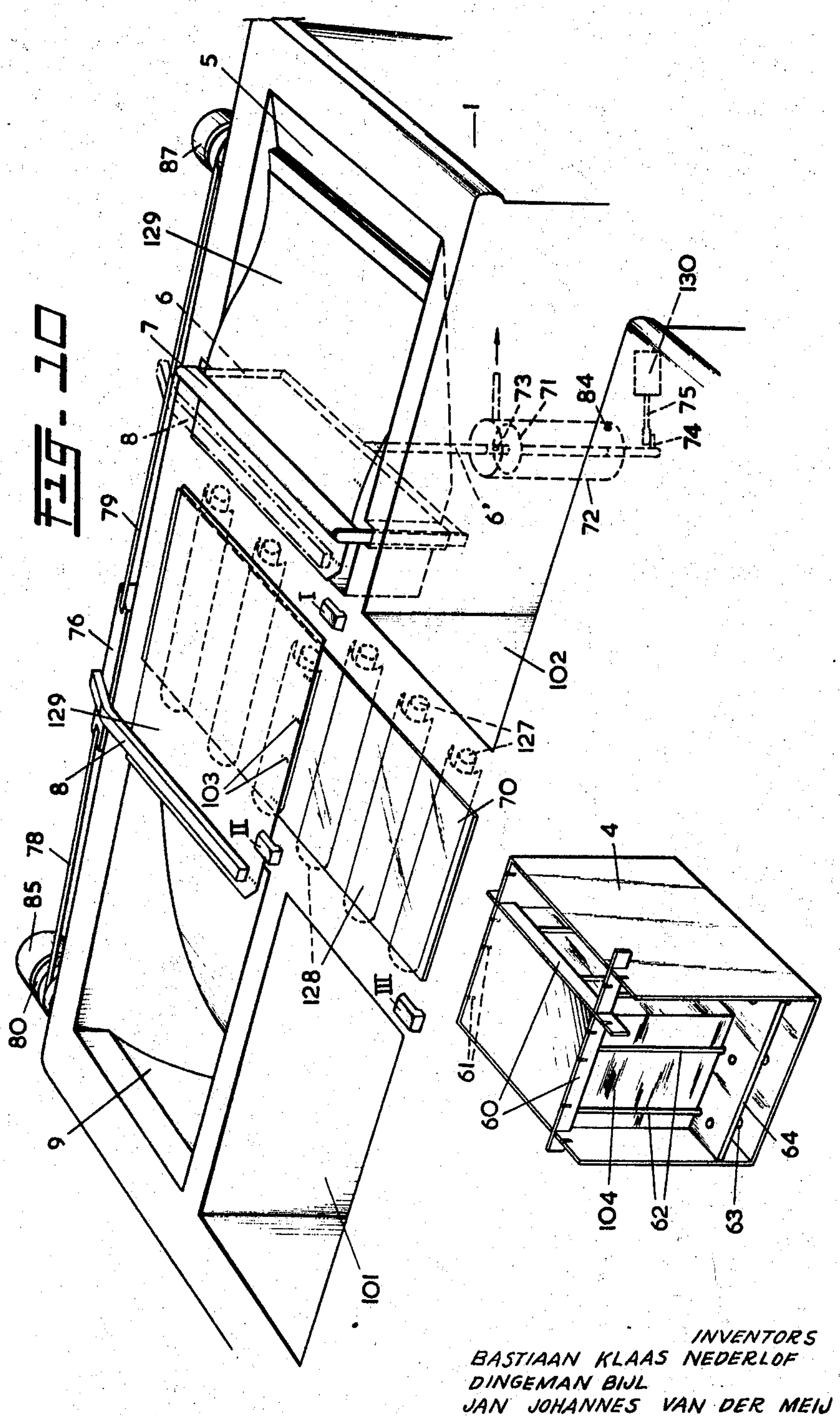
Figure 11:
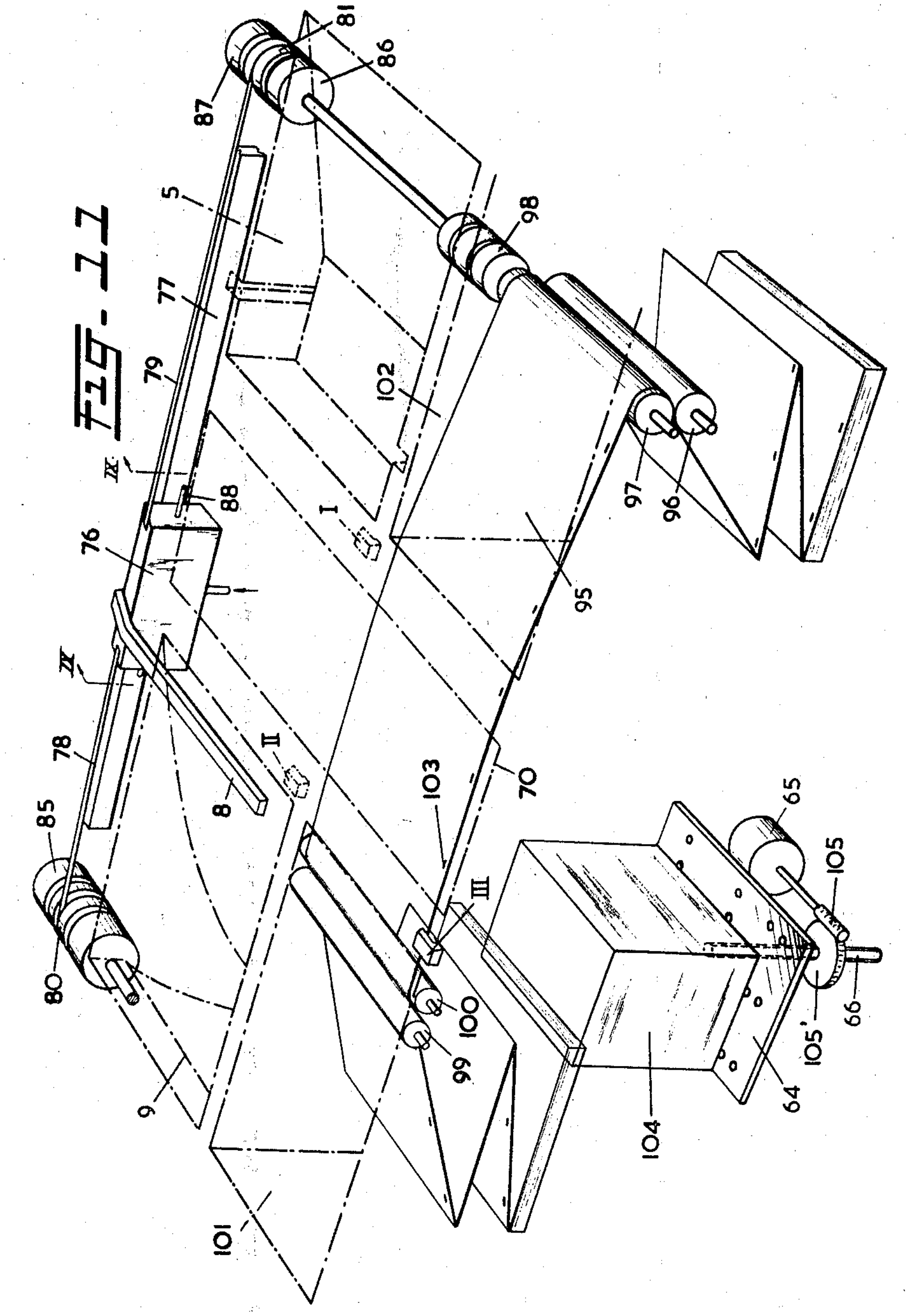
FIG. 11 is an enlarged cross-sectional view of a detail of FIG. 9, taken on the line XI—XI therein.
Figure 14:
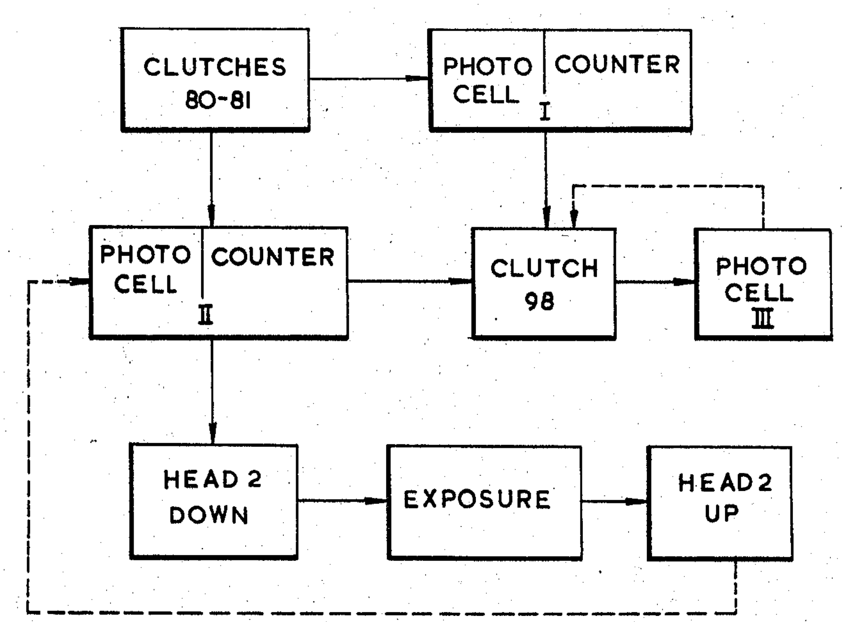
FIG. 14 is a diagrammatic showing of the interaction of various essential parts of the apparatus.

Referring particularly to FIGS. 1, 10, and 11, the photoprinting apparatus comprises a housing 1, along the upper face of which photosensitive and translucent materials can be moved along fixed paths.

Detachably held on an opening in said upper face or on a transparent portion thereof, is a photographic master in the form of a glass plate 70.

A suitable source of light 127, controlled by suitable shutter means 128, is disposed generally under said master 70.

Second masters, in the form of a translucent band or film 95, are fed in superimposition across the master 70 from left to right as seen in FIG. 11 by a driven roller 97, which cooperates with a pressure roller 96.

Third masters, in the form of translucent sheets 129, are accommodated in a countersunk container 5. The topmost of said sheets can be engaged by a vacuum operated bridge 7, and raised to a position where the sheet can be taken over from the bridge 7 by a suction head 8, which is movable from the container 5 across said master 70 to a countersunk receptacle 9, and back to said container 5.

Sheets of photosensitive material 104 are picked up from a container 4 countersunk in the top of the housing 1 by a head 2 (see FIG. 2), which includes a perforated conveyor belt 11, which draws the photosensitive material against it by suction applied through said perforations. The head 2 is adapted to assume two main positions, a first position in which it is substantially in surface-to-surface contact with the top of the housing, with first, second, and third masters and photosensitive material sandwiched therebetween, and a second position in which it is slightly tilted away from the container 4, sufficient to allow the head 8 to pass under it. These positions partly govern the operation of the machine, in that in the first position both the second and third masters and the photosensitive material are immovable, and exposure is effected, and in the second position these masters and the photosensitive sheets are movable and no exposure is effected.

Turning now to the method according to the invention, the information to be reproduced is split up into information characteristic of the nature of a plurality of types of reproductions to be made, which is preferably recorded on the masters 70, items of main data, in the case illustrated recorded on the band or web 95, and items of subdata, in the case illustrated recorded on the sheets 129. The terms main data and subdata, as used in this specification, have no bearing on the importance of the data relative to each other, but are used merely to indicate that particular items of data (subdata) can be combined to groups which are each coordinated by one item of other data (main data).

The masters carrying the main data, in this case the web 95, are provided with opaque markings which can be read by a photocell III, that is, they intercept light falling on the photocell III, which thereby issues a signal causing the roller 97 to be disengaged from its drive means, so that the web 95 comes to a standstill.

Similar markings are provided on the sheets 129, and act on a photocell II to cause the same to issue a signal to stop the head 8.

There is further provided a photocell I, which reads the same markings to be read by the cell II, and the purpose and operation of which will be described hereinafter.

MEANS FOR MANIPULATING PHOTOSENSITIVE MATERIAL

Sheets of photosensitive material are fed along a fixed path along the top face of the housing 1 by a head generally indicated at 2. The head 2 is on one end supported by two arms 50, which are pivoted to it at 51, and on the other end hinged to the housing by means of trunnions 3. The arms 50 extend into the housing, and are sufficiently long to permit the head 2 to be turned up manually through an angle of about 30° to provide for easy access to the parts located thereunder. At their other end, the arms 50 are interconnected by a shaft 52, which carries a roller 53, which is normally supported in a hook-shaped recess of a disk 54, mounted for rotation within the casing 1. The disk 54 forms part of a pneumatically operated device, which comprises a cylinder 55, a piston 56 mounted for to and fro movement in said cylinder, a piston rod 56' projecting from the cylinder, and a lever 56'' having one end fixedly connected to the disk 54 and the other end pivoted to the piston rod 56'. The cylinder is on opposite sides of the piston 56 in communication with branches of a conduit 57, leading to a suitable source of vacuum (not shown), the branches controlled by valve means 58 and 59, respectively. When the piston is moved to the left in FIG. 7 the disk 54 is turned, and the hook 54' engages the roller 53, and pulls the arms 50 and thereby the head 2 downwardly to the printing position described hereinbefore. When the piston is again actuated to move to the other side the head 2 resumes the position shown in FIG. 7.

Figures 2, 3, 4, 5:
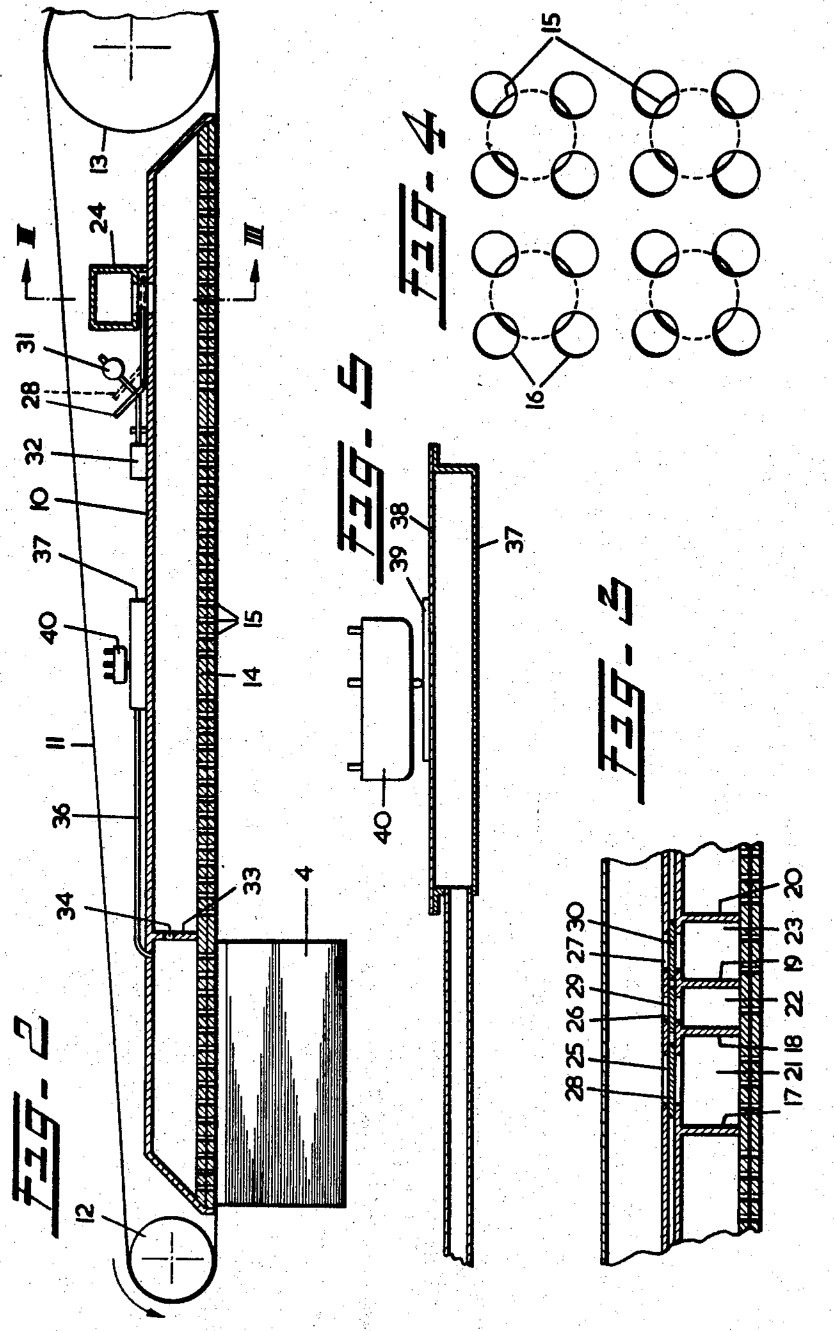
FIG. 2 is a longitudinal section of a conveyor means for supplying and displacing photosensitive material.
FIG. 3 is a partial cross-section taken on the line III—III in FIG. 2.
FIG. 4 illustrates an arrangement of superposed perforations respectively formed in an endless belt and in the bottom of a box member of said conveyor means.
FIG. 5 illustrates, on a larger scale, a part of FIG. 2, namely, a pressure gauge and a switch.

The following description will be best understood by contemplation of FIG. 2 in conjunction with FIGS. 3, 4, 5 and 13.

Figures 7, 8, 9, 12, 13:
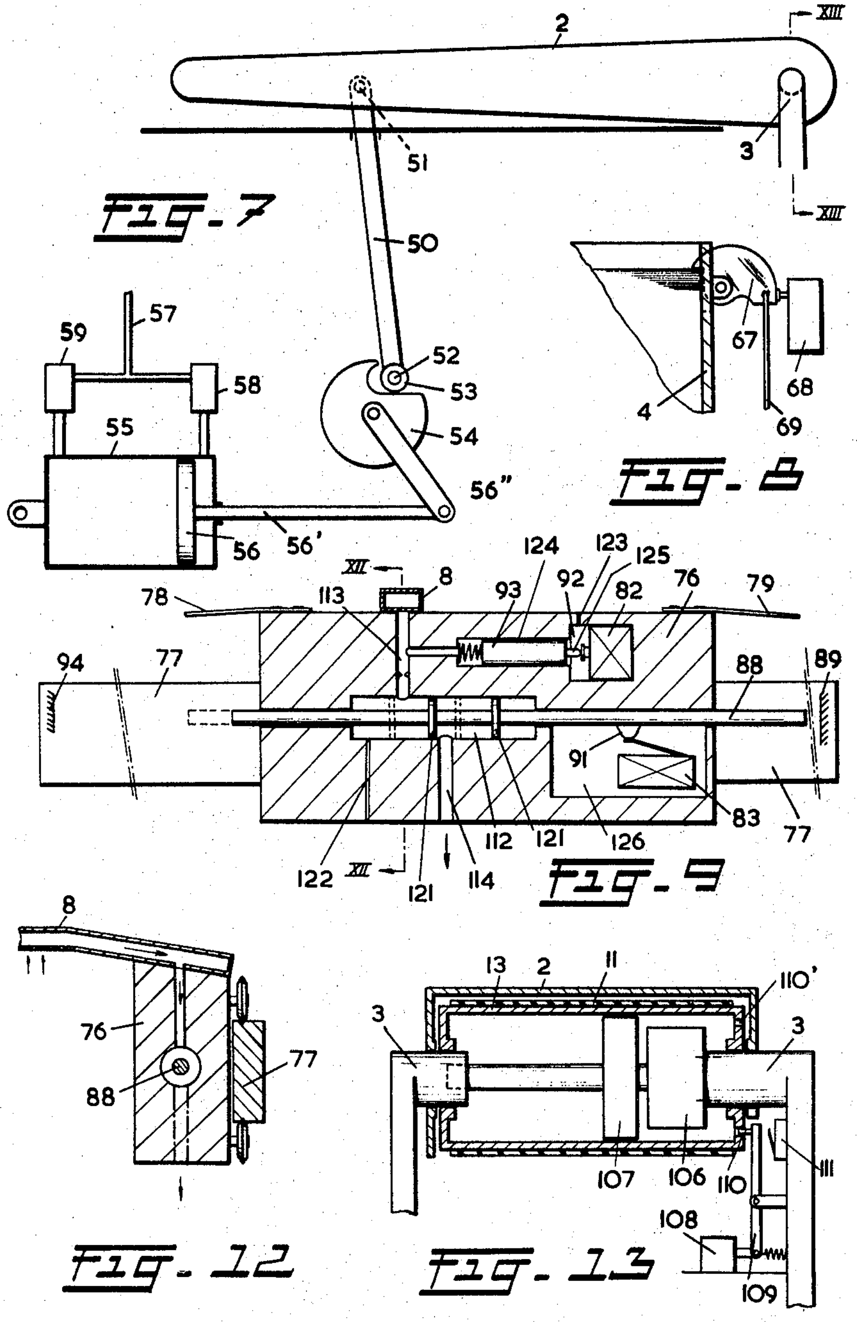
FIG. 7 illustrates means for operating the device of FIG. 2.
FIG. 8 shows a detail of the container illustrated in FIG. 6, with associated means for controlling the level of a stack of material in said container.
FIGS. 9 and 10 are perspective plan views of a photoprinter according to the invention, illustrating means for manipulating the photographic material that may be employed.
FIG. 12 is a cross-sectional view of a detail of FIG. 9, taken on the line XII—XII therein.
FIG. 13 is a cross-sectional view taken on the line XIII—XIII in FIG. 7.

The head 2 generally consists of a relatively narrow and long box 10. About the box 10, extends an endless belt 11, which is guided over two rollers 12 and 13. As shown in FIG. 13, the trunnions 3 not only carry the head 2, but also constitute a shaft on which roller 13 rotates. Housed in the roller 13 is a motor 106, fixedly secured to one of the trunnions 3. The rotation of the motor shaft can be transmitted to the roller 13 by means of an electric clutch 107. One end face of roller 13 is provided with two diametrically opposite holes 110', spaced equal distances from the axis of rotation of the roller, and fitting a locking pin 110. The locking pin is mounted on a spring-biased lever 109 pivoted intermediate the pin 110 and an electric magnet 108. Disposed opposite the pin 110 is a microswitch 11. During a short moment of energization of the magnet 108, the lever 109 is moved against the action of the spring to unlock the pin 110, and at the same actuates the switch 111 to couple the motor shaft to the roller 13 by means of a clutch 107. The roller will then rotate through 180°. At this point the pin 110 will snap into the other hole 110', and the lever 109 is disengaged from the switch 11, which will disconnect the clutch 107, and break the connection between the power shaft of the motor and the roller 13. It will be appreciated that the rotation of the roller through 180° moves the belt 11 along a distance equal to half the circumference of the roller 13, and this is sufficient to move the photographic material from one position to the next. There are four such positions spaced equal distances on the belt 11, the first being the pick-up position, the second being a passive position, the third being the first print position, and the fourth being the second print position.

The bottom 14 of the box 10 is provided with a large number of perforations 15. The belt 11 is, throughout its length, likewise provided with perforations, designated by 16, which are, however, of smaller diameter than the perforations 15. As best shown in FIG. 4, which illustrates a detail of a bottom view of the head 2, the relative positions of the perforations 15 and the perforations 16 are such that during any relative movement a large number of perforations overlap each other.

The box 10 is longitudinally divided into chambers by a number of partitions. In FIG. 3, four of such partitions are designated by the reference numerals 17–20. The chambers defined between these partitions are designated by the reference numerals 21–23. On the box 10 is provided a rectangular cross-channel 24, which is connected to a source of vacuum (not shown). The cross-channel 24 can be connected to any of the chambers through openings which can be closed with slides. FIG. 3 shows openings 25–27, which can be closed with slides 28–30. All slides are controlled by means of a camshaft 31, shown diagrammatically in FIG. 2. The position of each slide influences the position of a microswitch associated with such slide. Thus FIG. 2 shows slide 28 and switch 32. All the chambers of the box 10, such as chambers 21–23, are divided into two sections by means of a transverse partition 33. The two sections of each chamber formed by the transverse partition intercommunicate through a series of narrow holes 34. Through these holes the vacuum can propagate into those sections of the chambers which are located to the left of the transverse partition 33 in FIG. 2. Beneath this section of the box 10 is the supply container 4, which contains a stack of photosensitive material.

In order that the sucking area of the head 2 can be suited to different sizes of photosensitive material, the chambers 21–23 etc. are of different widths, so that adaptation to the size of the material used can be effected by a suitable combination of chambers. Thus, assuming that for a given size of material the total width of the chambers 21 and 22 together is suitable, the slides 28 and 29 must be open, and all the other slides must be closed. Naturally, the stack of paper in the container 4 is then also beneath the chambers 21 and 22.

When a sheet of photosensitive material has actually been drawn against the bottom face of the chambers 21 and 22, the pressure in these chambers will drop. If the pressure is not decreased, or insufficiently so, this implies that the sheet concerned has not been picked up, or is not in its proper position. For the purpose of checking this, each chamber is equipped with an indicator device, one of which is shown in FIG. 2, a similar device being shown in FIG. 5.

Assuming that FIG. 2, is a longitudinal section of the chamber 21, this chamber is connected with the indicator device through a tube 36. The indicator device consists of a flat box 37, closed at the top with a resilient diaphragm carrying a plate 39, which is arranged to control a microswitch 40. If, in a given case, the slide 28 is open, as shown in drawn lines in FIG. 2, the closed position being shown in dotted lines, the associated microswitch 40 is through the microswitch 32 connected in the electric circuit of the means for moving the roller 13. If the slide of any chamber is in a position in which a vacuum ought to be produced in such chamber, and nevertheless a vacuum is not produced, then the microswitch associated with the chamber prevents movement of the head 2, so that the whole apparatus comes to a standstill, in order to make it possible for the defect which has evidently occurred to be detected and remedied.

When the piston is again actuated to move to the other side, the head 2 resumes the position shown in FIG. 7.

Disposed under the free end of the head 2 is an open-topped container 4 for photosensitive material. The container is countersunk in the housing 1, and is formed with slots 61, fitting removable strips 60. The strips carry retaining members 62, which may be pins welded to them, and fit holes in the bottom of the container. By these means the container can be used for material of different sizes, without the stack of photosensitive material becoming misaligned. The container further has a vertically movable bottom 64, provided with suitable perforations, allowing the same to be moved free of the retaining members 62. The movement of the bottom 64, and the control of this movement will be best understood by contemplation of FIG. 11 in conjunction with FIG. 8. In FIG. 11, the movable bottom 64 is shown carrying a stack of photosensitive material 104, the container proper and the strips being omitted for the sake of clearness. The bottom 64 is moved by a motor 65 through suitable transmission means, in the case illustrated a rack 105 fixedly mounted on the bottom 64 and a pinion 105'. Referring now to FIG. 8, a rocker 67 is pivoted to the container 4 to bear on the stack of photosensitive material, and operates a microswitch 68 when the level of the material is too low for it to be engaged by the head 2. The microswitch actuates the motor 65, the bottom 64 is moved upwards, and when the photosensitive material has regained the required level the stack of material turns the rocker 67 out of engagement with the microswitch to stop the motor. During the downward movement of the head 2, the rocker 67 is turned away from the stack of material in the container 4 by means of a rod 69, which connects the rocker to one of the arms 50.

MEANS FOR FEEDING SECOND MASTERS

Referring particularly to FIG. 11, there is provided a path for feeding second masters, preferably in the form of a translucent web, folded zigzag-wise, such as the web 95. This path intersects the path of movement of the photosensitive material at the first exposure station. The web is fed from a countersunk container 101 by two pressure rollers 96, 97, the roller 97 being capable of being connected to or disconnected from a motor 98 by means of an electric clutch (not shown). Two tightening rollers 99, 100 of well-known construction are provided for keeping the web in substantially flat and tense condition as it is moved over the top of the housing.

MEANS FOR FEEDING THIRD MASTERS

Referring particularly to FIG. 10, a quantity of translucent sheets 129 is accommodated in a countersunk container 5. Disposed across container 5 is a bridge having a suction mouth 7 communicating with a hollow tubular frame 6. Connected to the frame is a hollow piston rod 6' having a puncture 73 just above a piston 71 mounted for up and down movement in a cylinder 72. The top of the cylinder is connected to a source of vacuum (not shown). The space under the piston communicates with the outer air through a hole 84 formed in the cylinder wall. The piston rod carries a projection 74 by which it can be arrested when moving either upwardly or downwardly by means of a locking pin 75 adapted to be retracted and immediately re-projected by an electric magnet 130.

The bridge is so mounted, and the various parts are so dimensioned that the suction mouth 7 can move into the container 5 onto the topmost of stack of transparent sheets and can be raised until the bottom of the suction mouth is slightly above the upper edge of the container 5. Suitable means are provided for guiding the depending arms of the frame 6, preferably countersunk in the sidewalls of the container 5. When no vacuum is applied to the space above the piston, the suction mouth 7 will rest on the topmost sheet of material by gravity. As soon as vacuum is applied the top sheet is drawn against the mouth 7, and the atmospheric pressure under the piston will push the assembly upwards until the leading edge of the sheet projects slightly above the upper edge of the container.

The master sheet is then in position for engagement by a suction head 8, which is substantially parallel to the bridge, and is movable towards and away from the same at a height above the surface of the casing sufficiently small for it to pass under the head 2 in the raised position of the latter. The operation of the head 8 and of its associated parts will be best understood in the light of FIGS. 9, 11 and 12. As best shown in FIG. 11, the head 8 is fixedly mounted on a block 76 of generally rectangular form, which is mounted for movement along a guide rail 77. Two bands 78, 79 of a suitable material, for example, steel, are secured to the block 76 on opposite ends thereof. The other end of the bands is lapped about pulleys 80 and 81, which are capable of being connected to and disconnected from the shafts of motors 85 and 86, and brake 87, by means of electric clutches 80 and 81, respectively.

The block 76 has a horizontal throughbore, through which extends a pin 88, which projects from the block on both sides, and is mounted for axial movement therein. Some way within the block, the bore is slightly widened to define a preferably concentric chamber 112. In the chamber 112, the pin 88 carries two spaced collars or pistons 121, sealing against the wall of the chamber, and thereby providing a movable, substantially air-tight compartment within the chamber 112. At two points on opposite sides of the chamber 112, axially spaced a selected distance from each other, the chamber is in communication with two bores 113 and 114, respectively, one (113)

communicating with the suction head 8, and the other (114) being connected to a source of vacuum (not shown). As will be readily seen from FIG. 9, the two bores 113 and 114 are in communication with each other, so that vacuum is applied to the suction head 8, in the dotted position of the air-tight compartment defined between the collars on the pin 88, and out of communication in the position shown in fully drawn lines.

The bore through which pin 88 extends has a further extension to form a chamber 126, in which is disposed a microswitch 83. In the position shown in FIG. 9, microswitch 83 is engaged by a stud 91 formed on the pin 88. The block further has a chamber 92, which communicates with the outer air through a passage 123 formed in the block, and accommodates a microswitch 82. Chamber 92 has a horizontal extension 124 of reduced diameter, in which is disposed a piston 93, which is spring-urged to engage the switch 82 by a suitable projection 125 formed on its active end. The space defined between the other end of the piston 93 and the wall of said reduced extension communicates with the bore 113.

The rail 77 is on both sides provided with suitable means 89 and 94, respectively. When the pin 88 strikes the abutment 89 the stud 91 will be moved out of engagement with the switch 83, and the air-tight compartment in chamber 112 will establish communication between the bores 113 and 114, so that vacuum will be applied to the suction head 8. Vacuum will also be applied to the space left of the piston 93, and the atmospheric pressure in chamber 92 will move the piston out of engagement with microswitch 82 against the action of the spring. Conversely, when pin 88 strikes abutment 94, the communication between bores 113 and 114 will be broken, so that the spring will urge the piston 93 into contact with microswitch 82, the vacuum being released through channel 122, and the stud 91 will engage the switch 83. The microswitches 82 and 83 control the electric clutches for coupling the motors 85 and 86 and brake 87 to pulleys 80 and 81, respectively.

OPERATION OF THE MACHINE

After the machine has been switched on, the head 2 is turned up manually, and sheets of paper or photosensitive material are placed against the underside thereof, so that when it has to pick up a sheet of photosensitive material all the perforations in the various positions of the active run of the belt through which vacuum is applied are closed except for those just above the container 4. The head is turned down again, and a switch 118 is operated to set the machine to function automatically. In the starting position, the block 76 of the suction head 8 is in the position shown in FIG. 9, and the block 76 will be moved to the right in FIG. 11. When pin 88 contacts abutment 89, microswitch 83 is operated to actuate an electric clutch to disengage pulley 81 from motor 86, and to actuate a second clutch to engage the pulley with brake 87. At the same time, the compartment 112 is moved to establish communication between bores 113 and 114, thereby causing suction in head 8. In the meantime vacuum is applied to the space above piston 71 in cylinder 72, which will cause bridge 7 to pick up a sheet from container 5, and lift it up slightly.

As the head 8 approaches its end position, electric magnet 130 is energized momentarily to retract and immediately re-project locking pin 75, so that projection 74 on the piston rod 6′, first retained to enable the head 8 to move over the sheet carried by the bridge 7, is released and moves above the locking pin 75. At this moment the sheet carried by the mouth 7 is engaged by the head 8. The vacuum in the space above piston 71 is then released, and it will be understood that the bridge 7 is now prevented by the locking pin 75 from dropping onto the sheet which is then only carried by the head 8. In the meantime, the pressure difference on opposite sides of the piston 93 will be sufficient to move the piston to the left to actuate switch 82. Switch 82 disengages brake 87 from pulley 81, and couples pulley 80 to motor 85, resulting in the head 8 with the sheet of transparent material to be moved to the left.

The first opaque marking on the sheet held by the head 8 will actuate the photocell II and give a pulse to disengage clutch 80 and apply the brake 87, excite a print counter 119, and, through a circuit arrangement for checking whether the conveyor belt 11 and the web of second transparent material are stationary, open valve 58 for the piston 56 to be moved to the left, thereby pulling the head 2 down onto the plate 70. During the downward movement of the head 2 a timing clock 120 is actuated to open the light unit for a selected period of time. At the end of this period, the head 2 is again lifted through the device 40 for checking whether a sheet of photosensitive material has been picked up by the head 2.

The upward movement of the head 2 releases the brake 87 and engages the clutch 80, so that the head 8 is moved further to the left. At the same time, the magnet 108 of the conveyor belt 11 is energized, as a result of which the belt 11 and the photosensitive sheets thereon are moved one position further.

The next opaque marking on the sheet 129 will cause the cycle to be repeated from the actuation of the photocell II. If the cell II finds no further markings, the head 8 is allowed to be moved to receptacle 9. At that point pin 88 strikes abutment 94, the communication between bores 113 and 114 will be broken, and the sheet will be deposited in the receptacle 9. Subsequently the head 8 is moved to the right, as described hereinbefore, to pick up a next sheet from the suction mouth 7.

It may be necessary to reproduce some items of data on the sheets 129 on one type of form, and other items on another type of form, or it may be desirable to reproduce two or more items at the same time. To provide for these possibilities, the photocell II is formed as a battery of photocells, extending in side-by-side relationship across the path of movement of the sheets 129, and opaque markings are provided at appropriate positions along tracks spaced transversely of the sheets. In FIG. 10, a sheet 129 is shown carrying three tracks of such opaque markings 103. It will be understood that it is necessary to pass the masters as many times through the machine as there are types of forms to be made, selecting before each pass which of the masters 70 is to be used, and which of the tracks of markings 103 is to be read.

When the web 95 has been stopped by an opaque marking thereon, it is moved on to the next opaque marking upon instruction from the sheets 129. This instruction can be produced in various ways. Since first the data of the web 95 are printed on a sheet of photosensitive material, and then the data of the sheets 129 on the same sheet, it is necessary to change the master of the web 95 when the penultimate item of a group has been printed. For this purpose the cell II includes an additional photocell adapted to read opaque markings to be provided at appropriate positions along a track separate of the other mrakings, and thereby issue a signal for moving the web 95. However, the penultimate item of a group to be printed need not always be the same according to all the programmes recorded in the tracks of data. According to a particular feature of the invention, there is provided a device, conveniently referred to as the photocell I, which comprises a battery of photocells similar to those of the cell II, and reads the same track of markings as the cell II, entering the number thereof in a counting register. Each print produced in response to a marking recorded in the counting mechanism also enters a digit in a counting register, which may conveniently be the same counting register, and as soon as the difference between these two countings is 1, a signal is produced to move the web 95. When a group of items is recorded on a plurality of sheets 129, this signal is dependent on a signal produced by the additional photocell associated with the cell II in response to a marking provided on that sheet 129 which carries the penultimate item of the group to be printed.

The apparatus may be conveniently provided with switches for automatic or non-automatic operation. Thus there is shown a track selector switch 115, to select which of a plurality of tracks of markings on the translucent sheets 129 is read, a programme selector switch 116, to set the programme which the machine is to carry out, and a selector switch 117 for setting the machine to print a desired number of prints.

For the sake of brevity, the necessary electric circuitry of the machine is not described in this specification. Those skilled in the art will readily be able to construct the circuitry in the light of the present description.

Although our invention has been described in the light of one specific embodiment, it will be appreciated that many modifications and variations can be made without departing from the spirit and scope of the invention as defined in and by the following claims.

We claim:

1. A method of separating information and reproducing the same on photosensitive material in re-combined form, which comprises recording such information, respectively, on a first, a second, and a third collection of *a*, *b*, and *c* transparent information carrying units, respectively, each unit of said first collection carrying *e* items of subdata, as well as *d* series of yes-no signals, each corresponding with at least one of said items of subdata and adapted to be sensed by sensing means, the *n*th unit of said second collection carrying at least one item of main data associated with the subdata appearing on the *n*th unit of said first collection, it being understood that *b* is equal to *a*, and each unit of said third collection carrying information characteristic of the nature of one of *c* types of reproductions to be made, and successively printing selected ones of said items of subdata on photosensitive material in response to each yes signal of a predetermined one of said *d* series of yes-no signals, in combination with their associated items of main data and the information carried by a selected one of said third collection.

2. A method according to claim 1, wherein the units of said first collection also carry the items of main data associated with the items of subdata appearing thereon.

3. A method of separating information and reproducing the same on photosensitive material in re-combined form, which comprises recording such information, respectively, on a first, a second, and a third collection of *a*, *b*, and *c* transparent information carrying units, respectively, each unit of said first collection carrying *e* items of subdata, as well as *d* series of yes-no signals, each corresponding with at least one of said items of subdata and adapted to be sensed by sensing means, the *n*th unit of said second collection carrying at least one item of main data associated with the subdata appearing on the *n*th unit of said first collection, it being understood that *b* is equal to *a*, and each unit of said third collection carrying information characteristic of the nature of one of *c* types of reproductions to be made, sensing each unit of said first collection a first time to count the number ($m$) of yes signals of a selected series of yes-no signals appearing on such unit, sensing such unit a second time to thereby cause selected items of subdata to be printed on photosensitive material on which the associated main data has been printed during the preceding printing operation, and to cause the *n*th unit of said second collection to be replaced by the $(n+1)$th unit thereof after completion of the $(m-1)$th print of the *n*th unit of said first collection.

4. A method according to claim 3, wherein the units of said first collection also carry the items of main data associated with the items of subdata appearing thereon.

5. A method according to claim 3, wherein at least some of the units of said first collection are constituted by a plurality of information carriers, the last carrier to be printed of each unit carrying a separate yes-instruction in addition to said series of yes-no signals, and all the other carriers of said first collection carrying instead a separate no-instruction which overrules the instruction for replacement of the *n*th unit of the second collection by the $(n+1)$th unit thereof.

6. A method according to claim 1, wherein each no-signal is constituted by the absence of a yes-signal.

7. A method according to claim 3, wherein each no-signal is constituted by the absence of a yes-signal.

8. A photoprinting apparatus which comprises a generally closed housing accommodating a source of light controlled by shutter means, means for admitting passage of light from said source through a portion of the top of said housing for exposure of photosensitive material to said light, means for holding a selected one of a collection of first masters on said portion, means for feeding a collection of second masters across said first master to intersect the same in superimposition thereto at a first exposure station, means for feeding a collection of third masters across said first master to intersect the same in superimposition thereto at a second exposure station, said exposure stations being spaced longitudinally on said portion of the top of said housing, means for feeding a length of photosensitive material along a path of movement substantially at right angles to and disposed above the paths of movement of said second and third masters, and co-operating with means for holding said length of photosensitive material and at least one selected one of said second masters on said first exposure station to effect a first exposure through a combination of said first master and said second master, and with means for holding said length of photosensitive material and at least one selected one of said third masters on said second exposure station for exposure through a combination of said first master and said third master.

9. A photoprinting apparatus which comprises a generally closed housing accommodating a source of light controlled by shutter means, means for admitting passage of light from said source through a portion of the top of said housing, means for holding a selected one of a collection of first masters on said portion, means for feeding a collection of second masters across said first master to intersect the same in superimposition thereto at a first exposure station, means for feeding a collection of third masters across said first master to intersect the same in superimposition thereto at a second exposure station, and means for holding selected ones of said second masters at said first exposure station and selected ones of said third masters at said second exposure station for simultaneous exposure of different lengths of photosensitive material advanced stepwise in superimposition across the paths of movement of said second and third masters.

10. An apparatus according to claim 9, wherein the means for holding selected ones of said second and third masters on said exposure stations comprise means for stopping the means for feeding said second and third masters in response to a positive instruction recorded on such selected ones of said second and third masters.

11. An apparatus according to claim 9, wherein the means for holding selected ones of said second and third masters on said exposure stations comprise means for stopping the means for feeding said second and third masters in response to a positive instruction recorded on such selected ones of said second and third masters, as well as means for initiating the feeding of one master in response to a positive instruction recorded on the other master.

12. A photoprinting apparatus which comprises a generally closed housing accommodating a source of light controlled by shutter means, means for admitting passage of light from said source through a portion of the top of said housing, means for holding a selected one of a collection of first masters on said portion, means for feeding a collection of second masters across said first master to intersect the same in superimposition thereto at a first exposure station, means for feeding a collection of third masters across said first master to intersect the same in superimposition thereto at a second exposure station, and means for holding selected ones of said second masters at said first exposure station and selected ones of said third masters at said second exposure station for simultaneous exposure of different lengths of photosensitive material advanced stepwise in superimposition across the paths of movement of said second and third masters, each length being first fed to said first exposure station and held there for a first exposure, and then fed to said second exposure station and held there for a second exposure.

13. An apparatus according to claim 12, wherein the means for holding selected ones of said second and third masters on said exposure stations comprise first and second sensing means arranged to stop the means for feeding said second and third masters in response to a positive instruction recorded on such selected ones of said second and third masters, the means for sensing said third masters cooperating with a third sensing means to thereby produce a signal when it has sensed a number of positive instructions determined by said third sensing means, said signal initiating movement of said second master.

14. An apparatus according to claim 12, wherein the means for holding selected ones of said second and third masters on said exposure stations comprise first and second sensing means arranged to stop the means for feeding said second and third masters in response to a positive instruction recorded on such selected ones of said second and third masters, the means for sensing said third masters cooperating with a third sensing means to thereby produce a signal when it has sensed a number of positive instructions determined by said third sensing means, said signal initiating movement of said second master, the production of said signal being dependent upon the sensing of a separate positive instruction associated with each group of third masters to be printed in combination with a selected one of said second masters.

15. A photoprinting apparatus which comprises a generally closed housing accommodating a source of light controlled by shutter means, means for admitting passage of light from said source through a portion of the top of said housing, means for holding a selected one of a collection of first masters on said portion, means for feeding a band of translucent material comprising second masters across said first master to intersect the same in superimposition thereto at a first exposure station, means for feeding a collection of sheets of translucent material, each comprising at least one third master, across said first master to intersect the same in superimposition thereto at a second exposure station, and means for holding selected ones of said second masters at said first exposure station and selected ones of said third masters at said second exposure station for simultaneous exposure of different lengths of photosensitive material advanced stepwise in superimposition across the paths of movement of said second and third masters.

16. An apparatus according to claim 15, wherein the means for holding selected ones of said second and third masters on said exposure stations comprise photocell means disposed adjacent the paths of movement of the respective masters and operable to receive light from said source and produce a signal in response to interception of said light by opaque markings on said translucent material passing between said source and said cells as the masters are fed to their respective exposure stations, said signal causing the translucent material to be stopped.

17. A photoprinting apparatus which comprises a generally closed housing accommodating a source of light controlled by shutter means, means for admitting passage of light from said source through a portion of the top of said housing, means for holding a selected one of a collection of first masters on said portion, means for feeding a band of translucent material comprising second masters across said first master to intersect the same in superimposition thereto at a first exposure station, means for feeding a collection of sheets of translucent material, each comprising at least one third master, across said first master to intersect the same in superimposition thereto at a second exposure station, and means for holding selected ones of said second masters at said first exposure station and selected ones of said third masters at said second exposure station for simultaneous exposure of difference lengths of photosensitive material advanced stepwise in superimposition across the paths of movement of said second and third masters, each length first fed to said first exposure station and held there for a first exposure, and then fed to said second exposure station and held there for a second exposure.

18. An apparatus according to claim 17, wherein the means for holding selected ones of said second and third masters on said exposure stations comprise first photocell means disposed adjacent the path of movement of said second masters, second photocell means disposed adjacent the path of movement of said third masters, each of said photocell means being operable to receive light from said source and produce a first signal in response to interception of said light by opaque markings on said translucent material passing between said source and said cells, said second photocell means cooperating with a third photocell means disposed adjacent the path of movement of said sheets of translucent material and operable to receive light from said source and produce a second signal in response to interception of said light by the opaque markings on said sheets, thereby entering the number of markings to be read by said second photocell means in a counting register, the number of prints produced in response to the signals of said second photocell means being substracted from the number of markings entered in said counting register, said counting register being adapted to produce a third signal when passing from the digit 2 to the digit 1, said signal initiating movement of said band of translucent material.

19. An apparatus according to claim 17, wherein the means for holding selected ones of said second and third masters on said exposure stations comprise first photocell means disposed adjacent the path of movement of said second masters, second photocell means disposed adjacent the path of movement of said third masters, each of said photocell means being operable to receive light from said source and produce a first signal in response to interception of said light by opaque markings on said translucent material passing between said source and said cells, said second photocell means cooperating with a third photocell means disposed adjacent the path of movement of said sheets of translucent material and operable to receive light from said source and produce a second signal in response to interception of said light by the opaque markings on said sheets, thereby entering the number of markings to be read by said second photocell means in a counting register, the number of prints produced in response to the signals of said second photocell means being substracted from the number of markings entered in said counting register, said counting register being adapted to produce a third signal when passing from the digit 2 to the digit 1, said signal initiating movement of said band of translucent material, in dependence upon a fourth signal produced by an additional photocell associated with said second photocell means, in response to interception of light incident thereon by opaque markings on said sheet in a track separate from the other markings thereon.

References Cited

FOREIGN PATENTS 831,513 3/1960 Great Britain.

NORTON ANSHER, *Primary Examiner.*

FRED L. BRAUN, *Assistant Examiner.*

U.S. Cl. X.R.

355—89, 99, 132